United States Patent
Kohata

(10) Patent No.: US 11,481,161 B2
(45) Date of Patent: *Oct. 25, 2022

(54) CONTROL METHOD AND STORAGE MEDIUM

(71) Applicant: CANON KABUSHIKI KAISHA, Tokyo (JP)

(72) Inventor: Toru Kohata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,125

(22) Filed: Feb. 23, 2021

(65) Prior Publication Data

US 2021/0173595 A1 Jun. 10, 2021

Related U.S. Application Data

(63) Continuation of application No. 16/691,367, filed on Nov. 21, 2019, now Pat. No. 10,956,097.

(30) Foreign Application Priority Data

Nov. 30, 2018 (JP) .............................. JP2018-225256

(51) Int. Cl.
*G06F 3/12* (2006.01)

(52) U.S. Cl.
CPC ............ *G06F 3/1206* (2013.01); *G06F 3/126* (2013.01); *G06F 3/1231* (2013.01); *G06F 3/1247* (2013.01)

(58) Field of Classification Search
None
See application file for complete search history.

(56) References Cited

U.S. PATENT DOCUMENTS

| 6,825,941 B1 * | 11/2004 | Nguyen | G06F 3/1205 |
| | | | 358/1.15 |
| 7,903,267 B2 * | 3/2011 | Yasui | G06F 3/1204 |
| | | | 358/1.15 |
| 2002/0035941 A1 * | 3/2002 | Nakao | G06F 3/1204 |
| | | | 101/484 |
| 2003/0184782 A1 * | 10/2003 | Perkins | G06F 3/1228 |
| | | | 358/1.13 |

(Continued)

FOREIGN PATENT DOCUMENTS

| CN | 1804782 A | 7/2006 |
| CN | 1841307 A | 10/2006 |

(Continued)

*Primary Examiner* — Ted W Barnes
(74) *Attorney, Agent, or Firm* — Canon U.S.A., Inc. IP Division

(57) ABSTRACT

A control method for an information processing apparatus that communicates with the information processing apparatus includes acquiring information on a first printing apparatus, displaying a first selection screen including a first display item regarding the first print apparatus on a display unit based on the acquired information on the first printing apparatus, and receiving, on the first selection screen, an instruction for registering the first printing apparatus onto the print control software. Based on the reception of the instruction for registering the first printing apparatus on the print control software, the first printing apparatus is registered onto the print control software and on OS-standard print software.

22 Claims, 14 Drawing Sheets

(56) References Cited

U.S. PATENT DOCUMENTS

| | | | | |
|---|---|---|---|---|
| 2004/0085572 | A1* | 5/2004 | Gomez | G06F 3/1225 358/1.15 |
| 2005/0046886 | A1* | 3/2005 | Ferlitsch | G06F 3/1232 358/1.15 |
| 2006/0158674 | A1* | 7/2006 | Mizoguchi | G06F 3/1205 358/1.13 |
| 2006/0221370 | A1* | 10/2006 | Iida | G06F 9/4411 358/1.13 |
| 2007/0091361 | A1* | 4/2007 | Matsugashita | G06F 3/1288 358/1.14 |
| 2007/0177192 | A1* | 8/2007 | Wang | G06F 3/1204 358/1.15 |
| 2007/0263235 | A1* | 11/2007 | Oomura | G06F 3/1204 358/1.4 |
| 2009/0168100 | A1* | 7/2009 | Uster | G06F 3/1285 358/1.15 |
| 2009/0316180 | A1* | 12/2009 | Nakagawa | G06F 3/1254 358/1.14 |
| 2010/0195144 | A1* | 8/2010 | Kawai | G06F 3/1222 358/1.15 |
| 2011/0075176 | A1* | 3/2011 | Nishio | G06F 3/1285 358/1.14 |
| 2011/0194141 | A1* | 8/2011 | Sweet | G06F 3/1232 358/1.15 |
| 2011/0255115 | A1* | 10/2011 | Tokuda | G06F 3/1257 358/1.13 |
| 2011/0261396 | A1* | 10/2011 | Takahashi | G06F 3/1285 358/1.15 |
| 2012/0254898 | A1* | 10/2012 | Nakata | G06F 9/4411 719/327 |
| 2013/0094045 | A1* | 4/2013 | Nakata | G06F 3/126 358/1.13 |
| 2013/0201504 | A1* | 8/2013 | Miller | G06F 3/1228 358/1.13 |
| 2014/0233050 | A1* | 8/2014 | Kishida | G06F 3/1284 358/1.13 |
| 2016/0077770 | A1* | 3/2016 | Morita | G06F 3/1256 358/1.15 |
| 2017/0264781 | A1* | 9/2017 | Bhatt | H04N 1/00411 |
| 2018/0039455 | A1* | 2/2018 | Suzuki | G06F 3/1247 |
| 2018/0067704 | A1* | 3/2018 | Kobayashi | G06F 3/1232 |
| 2018/0210684 | A1* | 7/2018 | Kato | G06F 3/1204 |

FOREIGN PATENT DOCUMENTS

| | | |
|---|---|---|
| CN | 104081332 A | 10/2014 |
| JP | 2002-073304 A | 3/2002 |
| JP | 2015-508921 A ‡ | 3/2015 |

\* cited by examiner

‡ imported from a related application

FIG.4

| Addition of Printer | |
|---|---|
| Please select a printer to be added | |
| Printer Name | Type |
| Printer A | USB |
| Printer A | Network |
| Printer A | OS-Standard |
| Printer A2 | OS-Standard |
| Printer B | Network |

Add

FIG.12

| Addition of Printer | |
|---|---|
| Please select a printer to be added | |
| Printer Name | Type |
| Printer A | USB |
| Printer A | Network |
| Printer A | OS-Standard |
| Printer A For PrintApp | OS-Standard |
| Printer B | Network |

Add

CONTROL METHOD AND STORAGE MEDIUM

CROSS-REFERENCE TO RELATED APPLICATIONS

This application is a Continuation of U.S. patent application Ser. No. 16/691,367, filed Nov. 21, 2019, which claims the benefit of Japanese Patent Application No. 2018-225256, filed Nov. 30, 2018, both of which are hereby incorporated by reference herein in their entirety.

BACKGROUND OF THE INVENTION

Field of the Invention

The present disclosure relates to a control method and a storage medium. In particular, the present disclosure relates to a control method and a storage medium for print control software.

Description of the Related Art

There is a technique that enables an operating system (hereinafter referred to as OS) to provide a standard print function (hereinafter referred to as OS-standard print function) without software (hereinafter specific printer driver) provided by a printer vendor and specific to a printer (see Japanese Unexamined Patent Application Publication (Translation of PCT Application) No. 2015-508921).

SUMMARY OF THE INVENTION

According to an aspect of the present invention, a control method for an information processing apparatus, includes acquiring information on a first printing apparatus that communicates with the information processing apparatus, displaying a first selection screen including a first display item regarding the first printing apparatus, on a display unit, based on the acquired information on the first printing apparatus, and receiving, on the first selection screen, an instruction for registering the first printing apparatus onto print control software, wherein the first printing apparatus is registered on the print control software and on OS-standard print software, based on the reception of the instruction for registering the first printing apparatus on the print control software.

Further features of the present invention will become apparent from the following description of exemplary embodiments with reference to the attached drawings.

BRIEF DESCRIPTION OF THE DRAWINGS

FIG. 4 is a schematic view illustrating a printer addition screen of an operating system (OS).

FIG. 12 is a schematic view illustrating printer addition screen of an OS.

DESCRIPTION OF THE EMBODIMENTS

Based on information acquired from a printer, an operating system (OS) determines whether the printer supports an OS-standard print function. If the printer supports the OS-standard print function, the OS transmits print data generated by the OS-standard print function to the printer. Some printers do not support the OS-standard print function. In such cases, print data generated by the OS-standard print function cannot interpret print data. Even in the case where the printer supports the OS-standard print function, there may be occasions when printing based on detailed print settings that are not provided by the OS-standard print function is desired.

Exemplary embodiments according to the present disclosure are described in detail below with reference to the accompanying drawings. The following exemplary embodiments are not intended to limit the present invention according to the scope of claims, and not all of the combinations of features described in the present exemplary embodiments are necessarily essential for a solution of the present invention.

<System Configuration>

Figure 1:
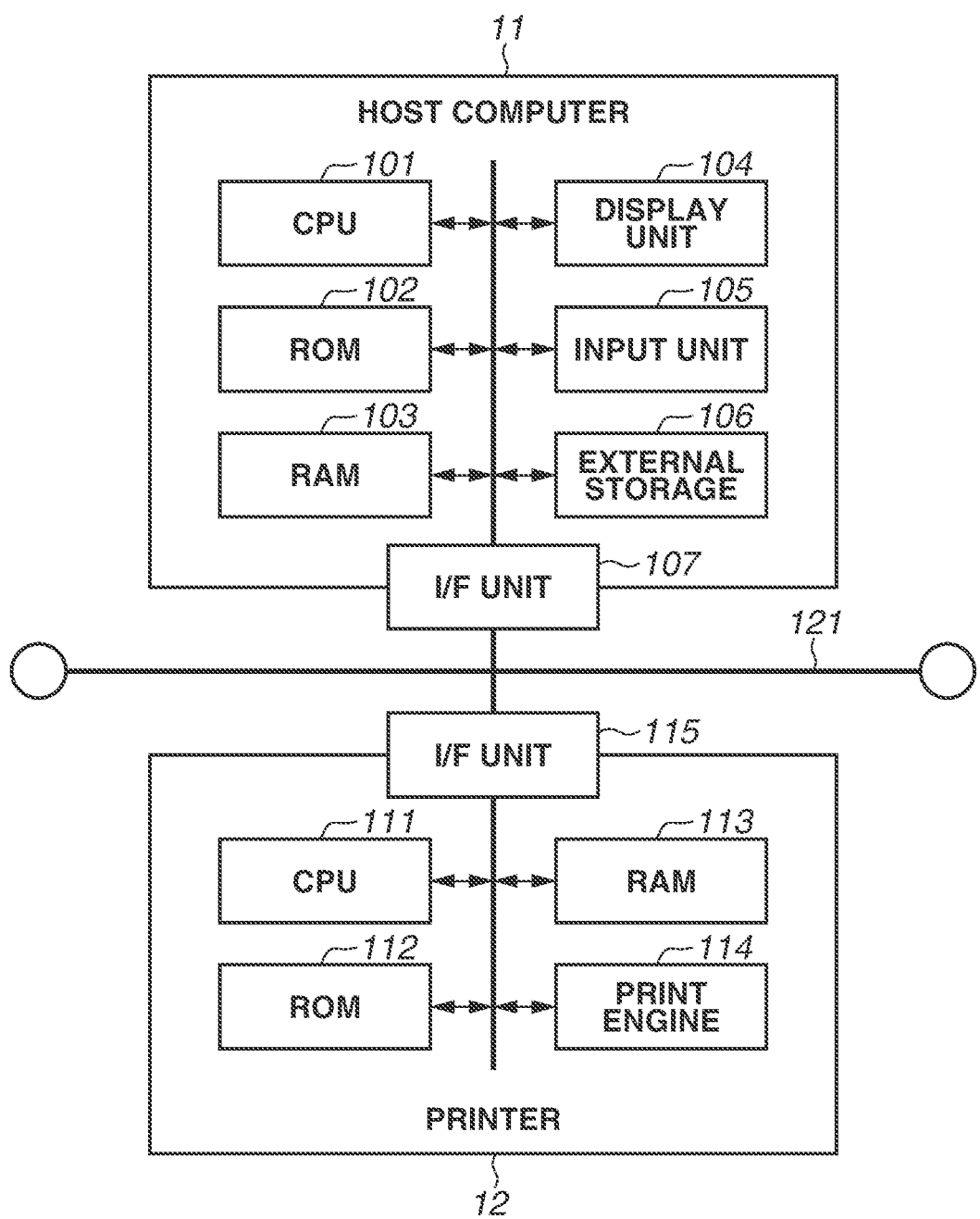
FIG. 1 is a block diagram illustrating a hardware configuration of an image forming system.

A hardware configuration of an image forming system according to a first exemplary embodiment is described with reference to a block diagram illustrated in FIG. 1. FIG. 1 illustrates an example of a print system in which a host computer 11 and a printer 12 can communicate with each other via a communication bus 121 such as Ethernet® or a universal serial bus (USB). While FIG. 1 illustrate only one such printer, a desired number of printers can be connected via the communication bus 121.

The host computer 11 is an example of an information processing apparatus. An operating system (hereinafter referred to as OS) is installed in the host computer 11. The present exemplary embodiment illustrates a case in which macOS has been installed. The OS is equipped with an OS-standard print system 202, which is OS-standard print software to be described below.

The host computer 11 is, for example, a personal computer (PC) and includes an interface unit 107, a central processing unit (CPU) 101, a read-only memory (ROM) 102, a random access memory (RAM) 103, a display unit 104, an input unit 105, and an external storage 106. The host computer 11 according to the present exemplary embodiment is not limited to a desktop PC and may be a notebook PC, a tablet PC, or a smartphone.

The host computer 11 transmits instructions for controlling the printer 12, print data, and setting commands, to the printer 12. The CPU 101 controls each unit of the host computer 11, and executes control programs such as the OS and an OS print data conversion utility 203 to be described below. The CPU 101 controls system operations using the OS stored in the ROM 102. The RAM 103 is used as a work area of the CPU 101. The external storage 106 stores various control programs, such as applications and the OS print data conversion utility 203.

The input unit 105 is an input device, such as a mouse and a keyboard, for operating the host computer 11. The display unit 104 is a display device that performs, for example, display for confirmation of information input from the input unit 105, display of a user interface screen for the OS or an application, and display of a message. The interface unit 107 is a communication module that transmits and receives data to and from the printer 12.

The printer 12, which is a printing apparatus, is an ink jet printer, for example. The printer 12 includes an interface (I/F) unit 115, a CPU 111, a ROM 112, a RAM 113, and a print engine 114. The CPU 111 is a central processing unit that controls the following units. The ROM 112 is a read-only memory and stores a computer program for controlling the print engine 114. The RAM 113 is a random access memory and temporarily stores a computer program required for the print engine 114 to operate, setting values received from the host computer 11, and the like.

The print engine 114 performs printing on a recording medium based on print data transmitted from the host computer 11. The I/F unit 115 is a communication module that receives print data from the host computer 11, and has, for example, a function to transmit current status information on the printer 12 from the printer 12 to the host computer 11. The status information herein is status data that indicates the state of the printer 12 that can be returned by the printer 12 in response to a request from the host computer 11 connected via the I/F unit 115. The status data herein is information for notifying a user of the operational status of the printer 12 such as "currently printing" or "standby state" or the error status of the printer 12 such as "no printing paper", "cover opened", or "no remaining ink amount".

<Software Configuration>

Figure 2:
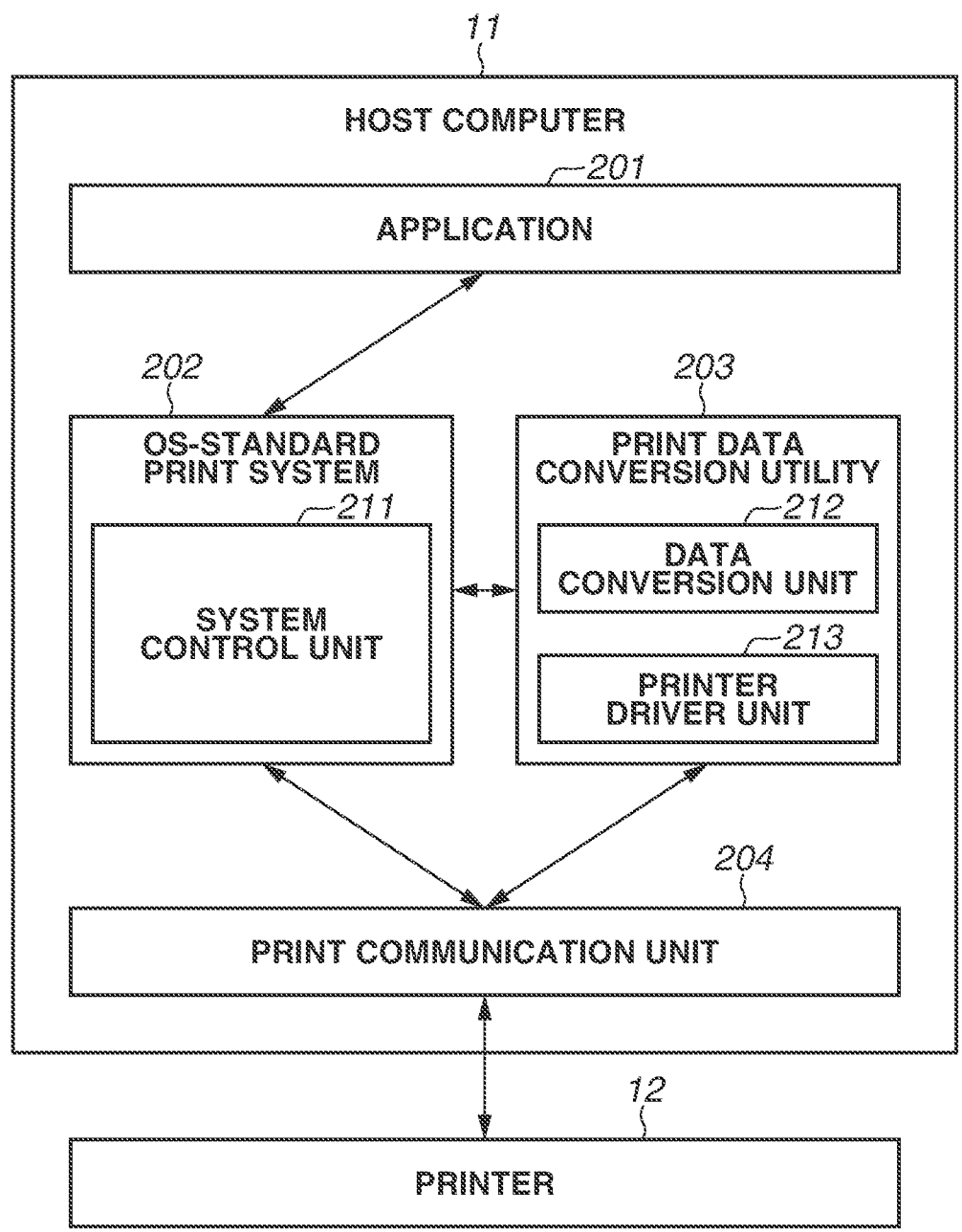
FIG. 2 is a block diagram illustrating a software configuration.

FIG. 2 is a block diagram illustrating a software configuration of the host computer 11 according to the present exemplary embodiment. The OS-standard print system 202 as OS-standard print software and the print data conversion utility 203 as print control software are installed in the host computer 11 to be operable. A drawing application 201 is further installed in the host computer 11.

The drawing application 201 is software that generates drawing data based on a user instruction. An application herein means software that can operate on the OS, which is basic software for the host computer 11. The drawing application 201 has a function to print the generated data, and examples thereof include word processing software for document creation, image editing software, and "New Year's card" creation software. Drawing data created using the drawing application 201 is data, for example, in a format of Portable Document Format (PDF).

After creating drawing data, the drawing application 201 makes a print request to the OS-standard print system 202 based on a user instruction. When a print request is made, a setting instruction for print settings can be accepted from the user through a setting screen provided by the print data conversion utility 203. When a print request is made to the OS-standard print system 202, a print job containing information on print settings and drawing data is transmitted to the OS-standard print system 202. The information on print settings has been generated by the print data conversion utility 203. The drawing data has been created by the drawing application 201. The information on print settings includes information on a paper size, a paper type, and a print queue in which printing is performed.

The OS-standard print system 202 is OS-standard print software equipped with standard functions necessary for generating print data, and performs spooling processing on the drawing data created by the drawing application 201 to generate print data in a certain format (hereinafter also referred to as "standard format"). The OS-standard print system 202 then performs processing to output the generated print data in the standard format to the print data conversion utility 203. Alternatively, in order to transmit the print data generated in the standard format directly to the printer 12, the OS-standard print system 202 performs processing to output the print data in the standard format directly to the print communication unit 204 without outputting the print data to the print data conversion utility 203. The OS-standard print software 202 acquires identification information, such as model information, on the printer 12 via the print communication unit 204 to determine whether the printer 12 supports the OS-standard print system 202. The information to be obtained for a determination of the support is not limited to the model information on the printer 12 and may be information such as capability information on the printer 12. Various kinds of processing in the OS-standard print system 202 are performed under the control of a system control unit 211 in the OS-standard print system 202.

The print data conversion utility 203 is software that converts print data in the standard format output from the OS-standard print system 202 into print data in a format specific to a corresponding printer vendor.

In the present exemplary embodiment, description is given under the assumption that the printer 12 does not support the OS-standard print system 202. When receiving print data generated in the standard format by the OS-standard print system 202, the printer 12 that does not support the OS-standard print system 202 cannot interpret the print data. For this reason, in the present exemplary embodiment, the print data conversion utility 203 is installed in the host computer 11. Thus, the print data conversion utility 203 performs conversion processing on print data in the standard format into print data in a format specific to the printer vendor (hereinafter also referred to as "individual format"), which can be interpreted by the printer 12. In this manner, a printer that does not support the functions of the OS-standard print system 202 can perform printing through the standard functions of the OS-standard print system 202.

Even in a case where the printer 12 supports the OS-standard print system (i.e., the printer 12 can interpret the print data in the standard format), it is preferable to use the print data conversion utility 203. When the print data conversion utility 203 is used, more functions can be provided. For example, the standard functions provided by the OS-standard print system 202 do not support detailed print quality settings for such as color matching processing, adjustments of hue and brightness, and the like. In other words, the functions provided by the OS-standard print system 202 is limited. Thus, by using the print data conversion utility 203, functions equivalent to those provided by a printer driver specific to the printer vendor can be provided.

The print data conversion utility 203 includes a data conversion unit 212 and a printer driver unit 213, and receives print data in the standard format and print setting information from the OS-standard print system 202 to perform processing necessary for print control. More specifically, first, the print data conversion utility 203 acquires the model information from the printer 12 via the print communication unit 204 and determines whether the printer 12 supports the OS-standard print system 202. The information to be obtained for a support determination is not limited to the model information on the printer 12 and may be information such as the capability information on the printer 12.

When determining that the printer 12 does not support the OS-standard print system 202, the print data conversion utility 203 perform specific processing for treating the printer 12 as if supporting the OS-standard print system 202. As described above, even if the system 202 supports the OS-standard print system 202, in a case where the printer 12 is supposed to provide functions equivalent to those of the printer driver specific to the printer vendor, it is preferable that this specific processing is executed. The details of the specific processing are described below with reference to FIG. 5. The print data conversion utility 203 uses the data conversion unit 212 and the printer driver unit 213 to perform processing to convert the print data in the standard format and the print setting information received from the OS-standard print system 202 into print data in the individual format. Even when the functions provided by the OS-standard print system 202 is limited, converting data by using the printer driver unit 213 makes it possible to provide functions equivalent to those provided by the printer driver specific to the printer vendor.

The print communication unit 204 is a communication module that transmits, to the printer 12, print data in the standard format output from the OS-standard print system 202 or print data in the individual format output by the print data conversion utility 203. In addition, the print communication unit 204 acquires data, such as status information, that have been transmitted from the printer 12.

<Printer Registration Processing>

Next, printer registration processing according to the present exemplary embodiment is described. In a case where a printer of a data processing target is registered, it is necessary to register the printer onto the OS-standard print system 202 in addition to the print data conversion utility 203. Hereinafter, the processing to register a printer may be represented as "addition".

Figure 3:
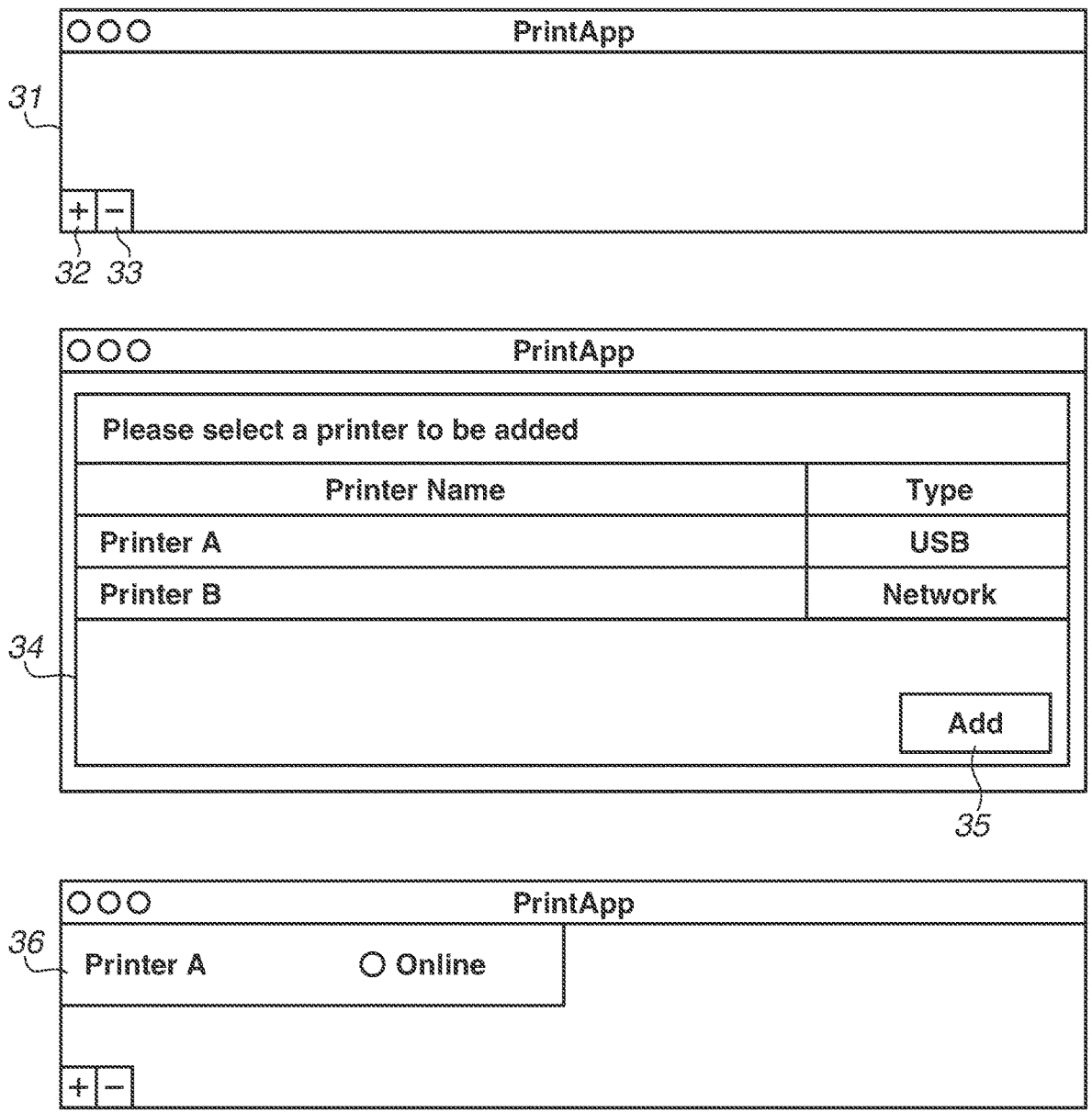
FIG. 3 is a schematic view illustrating a printer management screen of a print data conversion utility.

First, screen transitions in the printer addition processing will be described with reference to FIG. 3. FIG. 3 illustrates a printer management screen 31 provided by the print data conversion utility 203. The printer management screen 31 contains a printer addition screen display button 32 and a printer deletion screen display button 33. When the user presses the printer addition screen display button 32, a printer addition screen 34 (selection screen) is displayed. On the printer addition screen 34, display items indicating printers that do not support the OS-standard print system 202 and that are communicably connected to the host computer 11 are displayed. The user selects a printer from the printers displayed on the printer addition screen 34 and presses a printer addition button 35, whereby the processing to add a printer onto the print data conversion utility 203 is completed. The printer added onto the data conversion utility 203 is displayed as a printer list 36 on the printer management screen 31.

FIG. 4 illustrates a printer addition screen 41 provided by the OS-standard print system 202. The screen in FIG. 4 is preferably to be displayed in response to an event in which the print data conversion utility 203 transmits information on the added printer to the OS-standard print system 202 after the completion of addition of a printer onto the print data conversion utility 203. The screen in FIG. 4 may be displayed in response to a certain instruction from the user.

In FIG. 4, on the printer addition screen 41 (selection screen), the OS-standard print system 202 displays a list of printers connected to the host computer 11 in association with types. Examples of types herein includes "form of connection between the printer and the host computer", "installation state of a printer driver", and "support state of the OS-standard print system 202". If one of the types of the printer is different, two or more display items are displayed for one printer. In other words, two or more options are displayed for the same printer in a printer list 42. Furthermore, if the same printer of the same type, the second display item may automatically have "2" at the tail end of the printer name thereof when the registration is performed twice. In some cases, two items having exactly the same printer of the same type may be displayed.

For example, in FIG. 4, an item having "Printer A" as the printer name and "USB" as the type in the first line is displayed when the printer is connected to the host computer 11 via a USB cable. An item having "Printer A" as the printer name and "Network" as the type in the second line is displayed when a printer driver specific to a printer vendor is installed in the host computer 11. An item having "Printer A" as the printer name and "OS-standard" as the type in the third line is displayed when the printer is present on a network. The type "OS-standard" means "OS-standard network connection". When printer A is added onto the print data conversion utility 203 on the screen in FIG. 3 in this state, an item having "Printer A2" as the printer name and "OS-standard" as the type is displayed as illustrated in the fourth line in FIG. 4.

The user selects a printer to be added from the printer list 42 and presses an Add button 43, whereby the printer is added onto the OS-standard print system 202.

Figure 5:
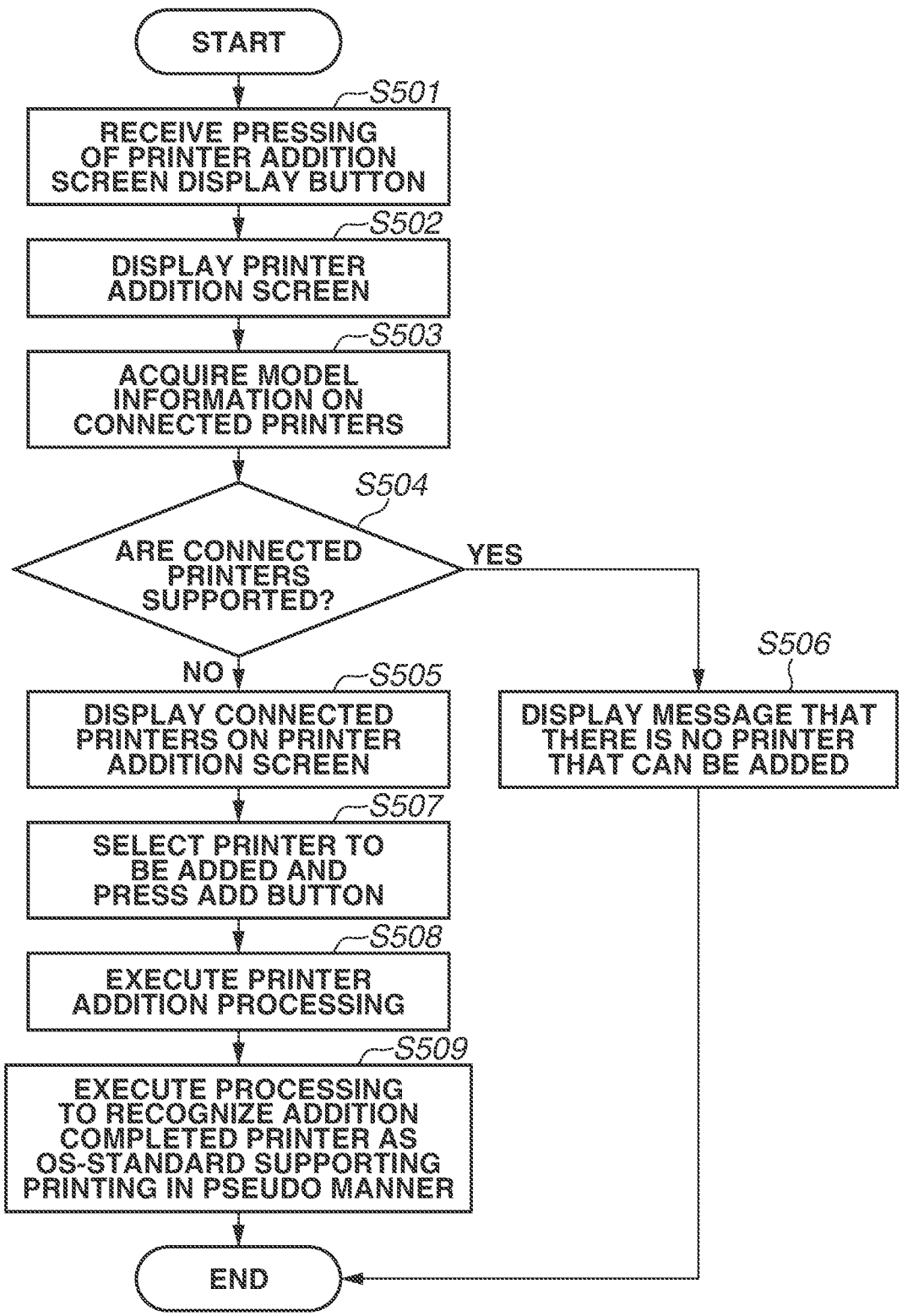
FIG. 5 is a flowchart illustrating printer addition processing in the print data conversion utility.

Next, the printer registration processing is specifically described with reference to FIG. 5. FIG. 5 illustrates a flowchart of the printer addition processing that the print data conversion utility 203 executes. Hereinafter, the print data conversion utility 203 is described as the agent of the processing. In practice, corresponding functions are implemented when the CPU 101 executes corresponding computer programs. Not entire processing is necessarily performed sequentially as a single process. The processing may be temporarily transferred to the OS and called again from the OS in some cases. The flowchart is intended to describe the main parts of the processing in the print data conversion utility 203 for the sake of convenience and in an easy-to-understand manner. The print data conversion utility 203 is preferably configured to function as resident software, which is active all of the time when the OS is activated.

In step S501, the print data conversion utility 203 receives pressing, by the user, of the printer addition screen display button 32 on the screen in FIG. 3.

In step S502, the print data conversion utility 203 starts processing to display the printer addition screen 34 on the display unit 104. Subsequently, in step S503, the print data conversion utility 203 acquires, via the print communication unit 204, the model information on printers that are connected to the host computer 11.

In step S504, based on the model information acquired from the printers, the print data conversion utility 203 determines whether the connected printers support the OS-standard print system 202. More specifically, the print data conversion utility 203 is preferably equipped with a white list to be used for determining which printers need to be supported by the print data conversion utility 203. The determination is preferably made with reference to the white list based on the acquired model information. Information to be obtained for the determination is not limited to the model information on the printer 12 and may be information such as the capability information on the printer 12. When the capability information is included in information on the supporting, a determination nay be made based on the support information without the use of the white list.

In step S504, if it is determined that at least one of the connected printers supports the OS-standard print system 202 (YES in step S504), a message that there is no printer that the user needs to add is displayed on the printer addition screen 34 in step S506, and the processing ends.

In step S504, if it is determined that none of the connected printers supports the OS-standard print system 202 (NO in step S504), the processing proceeds to step S505. In step S505, the print data conversion utility 203 displays the "printer name" and the "type" of the connected printers on the printer addition screen 34. In step S504, a condition that a connected printer does not support the OS-standard print system 202 means that the connected printer is a model to be supported by the print data conversion utility 203.

In step S507, the print data conversion utility 203 receives an operation made on the printer addition screen 34 by the operator user that a printer to be added is selected and the Add button 35 is pressed. On the printer addition screen 34 in FIG. 3, the printer name "Printer A" is displayed as the selected printer. In FIG. 2, the printer 12 is corresponds to "Printer A".

In step S508, the print data conversion utility 203 executes processing to add the selected printer to the print data conversion utility 203. As a result of this addition processing (registration processing), a printer queue of the printer 12 that corresponds to the "Printer A" is generated on the print data conversion utility 203.

If the addition of the printer onto the print data conversion utility 203 is completed in step S508, the processing proceeds to step S509. In step S509, the print data conversion utility 203 executes specific processing to cause the OS to recognize that the printer 12 supports the OS-standard print system 202 in a pseudo manner More specifically, this processing is executed by the print data conversion utility 203 transmitting, to the OS-standard print system 202, information on the addition-completed printer. The transmitted information on the printer includes the printer name, the form of connection, and the capability information. The capability information is information indicating capabilities and functions of the printer and includes information on the duplex printing capability and information on the color printing capability.

In step S509 in FIG. 5, the print data conversion utility 203 transmits, to the OS-standard print system 202, not only the information on the printer that has been registered on the print data conversion utility 203 but also a command for instructing the OS-standard print system 202 to register the printer. Upon receiving this registration instruction command, the OS-standard print system 202 performs processing to register the printer 12 onto the OS-standard print system 202 based on the obtained information on the printer. With this registration processing, a printer queue for the printer 12 is generated on the OS-standard print system 202.

If an item of "OS-standard" has been already registered for the printer name of "Printer A" as the type, an item having "Printer A2" as the printer name is registered onto the OS-standard print system 202 in the registration processing for this time. In this case, preferably, the print data conversion utility 203 acquires information on that registration, changes the printer name of the printer 12, which has been registered on the print data conversion utility 203 itself, from "Printer A" to "Printer A2", and reregisters the printer name again. This reregistration enables information registered on the print data conversion utility 203 and information registered on the OS-standard print system 202 to have the same printer name and is therefore preferable.

According to the present exemplary embodiment, a printer that does not support functions provided by the OS-standard print system 202 is automatically registered on the OS-standard print system 202 when it is registered on the print data conversion utility 203. With this registration processing, print data in the standard format generated by the OS-standard print system 202 is converted into print data in the individual format by the print data conversion utility 203. The print data in the individual format is transmitted to the printer. In this manner, a printer that does not support the functions of the OS-standard print system 202 is enabled to perform printing through the OS-standard print system 202.

When a printer is registered on the print data conversion utility 203, the user can open the printer addition screen 41 provided by the OS-standard print system 202 and register the printer on the OS-standard print system 202, as illustrated in FIG. 4. However, it is difficult to select a printer desired to be added from the printer list 42 on the printer addition screen 41. For example, when the same printer is displayed as two or more display items with the same name or similar names, it is difficult to specify which printer is to be added. However, in a system that automatically registers a printer on the OS-standard print system 202 based on the registration thereof on the print data conversion utility 203 as in the present exemplary embodiment, the user has no need to designate a printer by selecting the printer on the screen provided by the OS-standard print system 202. Thus, the user can more easily register a printer.

Figure 6:
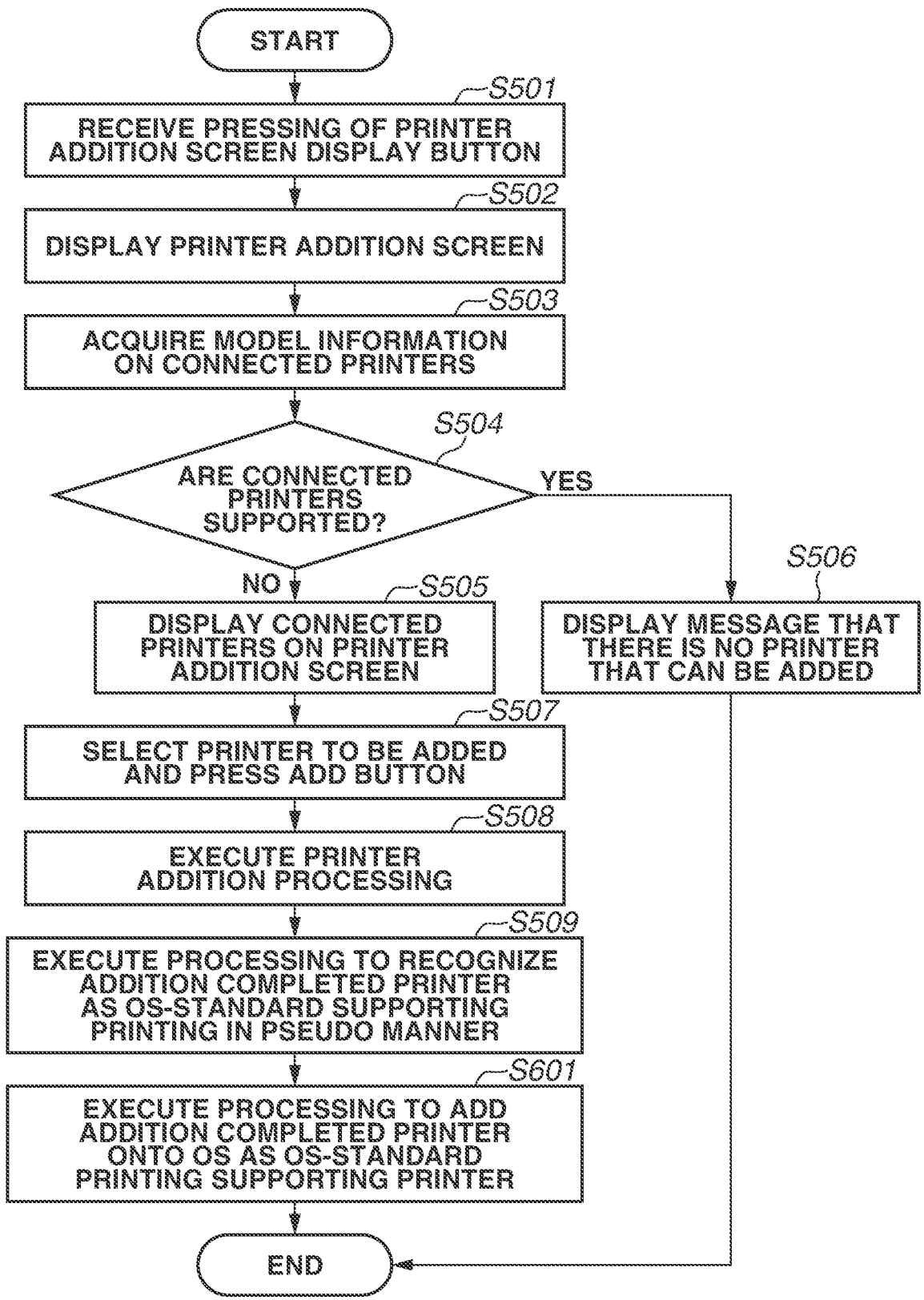
FIG. 6 is a flowchart illustrating printer addition processing in the print data conversion utility.

In the above-described example, in step S509, the print data conversion utility 203 transmits, in addition to the information on the printer registered thereon, the registration instruction command for instructing the OS-standard print system 202 to register the printer. However, the present exemplary embodiment is not limited to this example. A modification of the printer addition processing in the print data conversion utility 203 is described with reference to FIG. 6. FIG. 6 illustrates a flowchart of the printer addition processing that the print data conversion utility 203 executes. Processing in steps S501 to S508 in FIG. 6 is the same as that in FIG. 5 and description thereof is omitted.

In FIG. 6, after the completion of printer addition in step S508, then in step S509, the print data conversion utility 203 executes specific processing to cause the OS to recognize that the printer 12 supports the OS-standard print system 202, in a pseudo manner More specifically, this processing is executed by the print data conversion utility 203 transmitting, to the OS-standard print system 202, information on the addition-completed printer.

In step S601, the print data conversion utility 203 performs processing to cause the OS-standard print system 202 to register, on the OS-standard print system 202, a printer corresponding to the transmitted information on the printer. More specifically, the print data conversion utility 203 calls up the printer addition processing on the OS-standard print system 202. The print data conversion utility 203 then executes processing to automatically add the corresponding printer as an OS-standard print supporting printer onto the OS. As a result, as with FIG. 5, the corresponding printer is automatically registered on the OS-standard print system 202, whereby the user can avoid the trouble of manually select and designate a printer to be added on a screen provided by the OS-standard print system 202. Thus, the user can more easily register a printer.

The method according to the present exemplary embodiment illustrated in FIG. 5 or FIG. 6 is applicable to the printer 12 that supports the OS-standard print system 202. In other words, the method is applicable also to a case in which the printer 12 that supports the OS-standard print system 202 is registered on the print data conversion utility 203 so that the print data conversion utility 203 may be used. More specifically, in step S504, it is preferable to determine whether each of the connected printers supports the OS-standard print system 202 or functions, which are equivalent to those provided by a printer driver specific to a corresponding printer vendor, are to be provided thereto. In this manner, print settings equivalent to the printer driver specific to the printer vendor can be applied even to the printer 12 that supports the OS-standard print system 202.

As described above, in the present exemplary embodiment, the user opens a print dialog (print instruction screen) of the drawing application and then, on the print dialog, select a printer added onto the OS-standard print system 202 and instruct the printer to perform printing. In this manner, printing using the OS-standard print system 202 can be executed.

Next, a second exemplary embodiment is described. The second exemplary embodiment is characterized in that, after a printer is registered on the OS-standard print system 202, processing to inform the user of a printer that the user should select when making a print instruction, is performed. In the following description, description similar to the first embodiment is omitted and only differences therefrom are described.

<Informing Processing>

Figure 7:
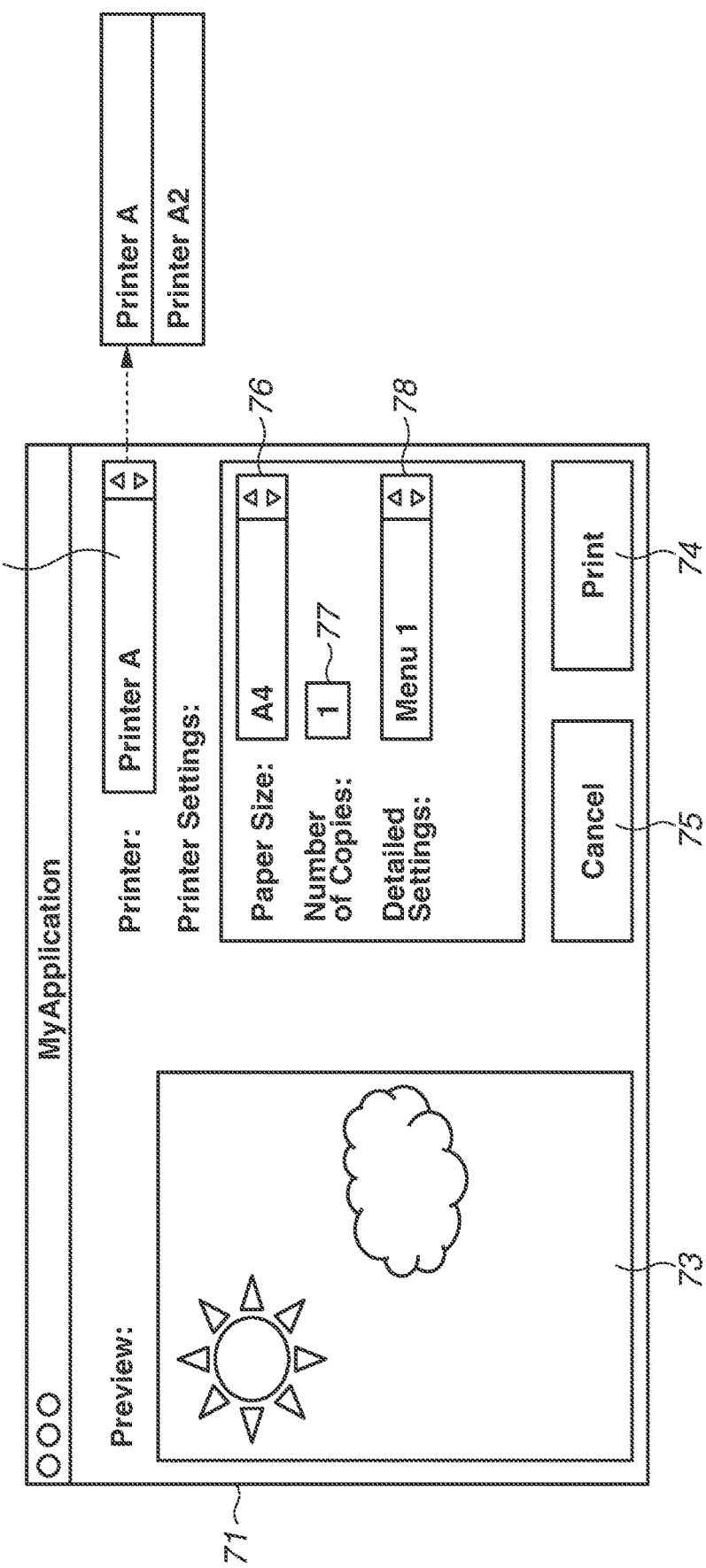
FIG. 7 illustrates a print dialog of a drawing application.

First, processing to be performed when a print instruction is given is described. FIG. 7 illustrates a state in which a print dialog 71 provided by the drawing application 201 is displayed. This print dialog 71 is a screen that is displayed in response to a print instruction that the user gives on a screen of the drawing application 201 after creating drawing data using the drawing application 201. The print dialog 71 includes a printer menu 72 for selecting a printer to execute printing, a print preview area 73, a Print button 74 for instructing a print request, and a Cancel button 75 for closing the print dialog 71 and returning to a condition controlled by the drawing application 201. The print dialog 71 further includes a paper size menu 76 for designating print settings, a number-of-copies setting item 77, and a detail settings menu 78 for applying additional detailed settings.

In the present exemplary embodiment, a case is described in which not only a printer automatically registered through the processing according to the first embodiment but also a printer supporting the OS-standard print system 202 have been registered on the OS-standard print system 202. In this case, it may be possible that the user have difficulty in determining which printer to select when giving a print instruction. Particularly when one printer is registered with two or more printer names, the user becomes confused because the user cannot grasp the printer to be selected. Furthermore, the user may select a printer name registered as a printer that support the OS-standard print system 202 (i.e., a printer name not registered on the print data conversion utility 203), which results in a limited functions in many cases. More specifically, a print instruction is executed without the involvement of the print data conversion utility 203, the number of functions to print settings that can be designated is reduced. For this reason, it is preferable that the user may be recommended to select a printer automatically registered in the first embodiment as far as possible. When a print instruction is executed via the print data conversion utility 203, it is preferable that the print data conversion utility 203 is started up in advance to display a print setting screen, so that the user can designate more detailed print settings such as color matching processing and adjustments of hue and brightness. Thereafter, when the Print button 74 is pressed in the print dialog 71 illustrated in FIG. 7, the print data conversion utility 203 preferably coverts print data while reflecting the detailed print settings designated in advance. These detailed print settings make it possible to provide print setting functions equivalent to those provided by a printer driver provided a printer vendor. In the present exemplary embodiment, a print setting screen provided by the print data conversion utility 203 may be displayed after the Print button 74 is pressed on the print dialog 71. In this case, more detailed print settings such as color matching processing and adjustments of hue and brightness can be designated on this print setting screen.

In the present exemplary embodiment, after a printer is automatically registered on the OS-standard print system 202 in the printer registration processing in the print data conversion utility 203 according to the first exemplary embodiment, the user is informed corresponding to the state of printer addition onto the OS-standard print system 202.

Figure 8:
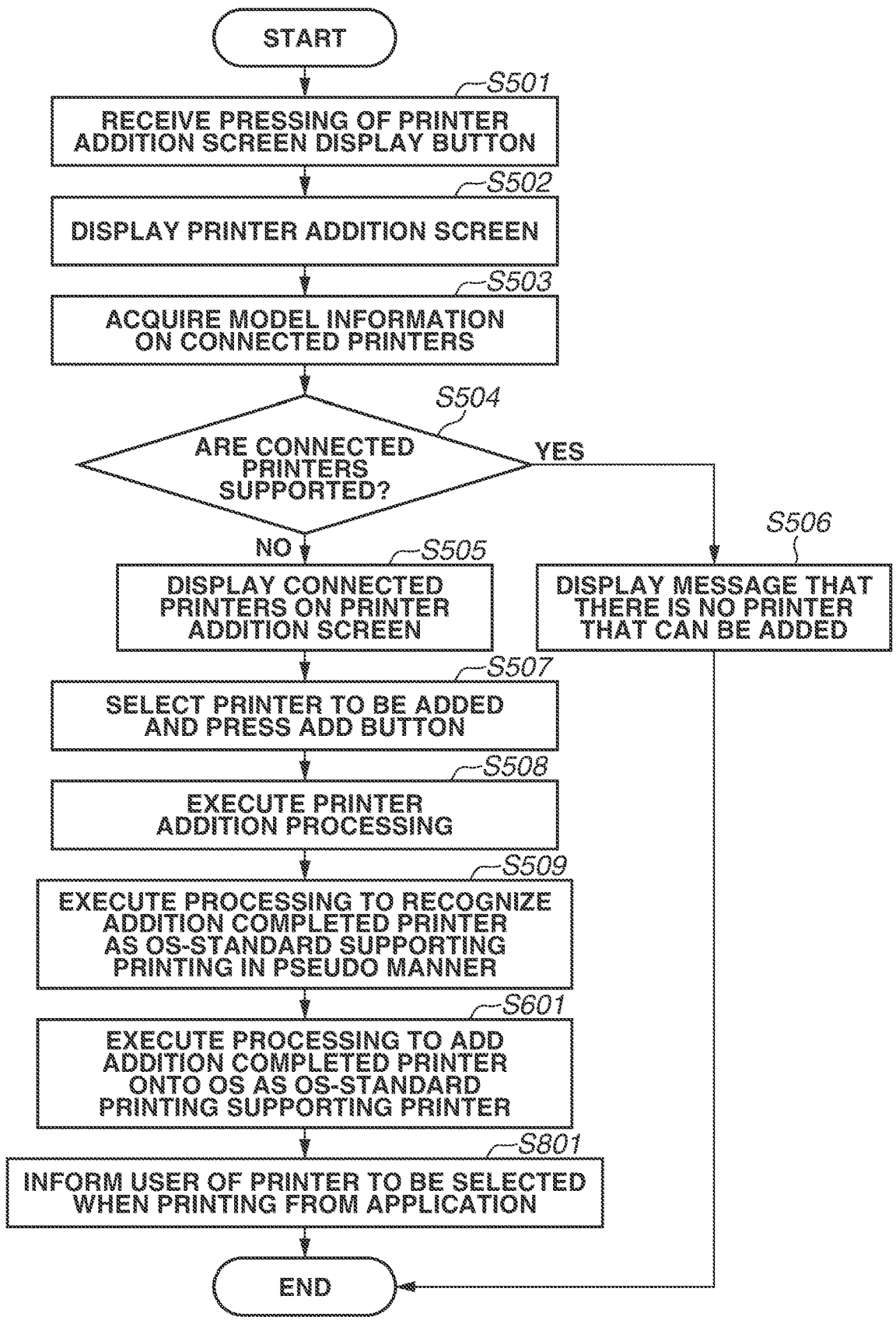
FIG. 8 is a flowchart illustrating printer addition processing in the print data conversion utility.
Figure 9:
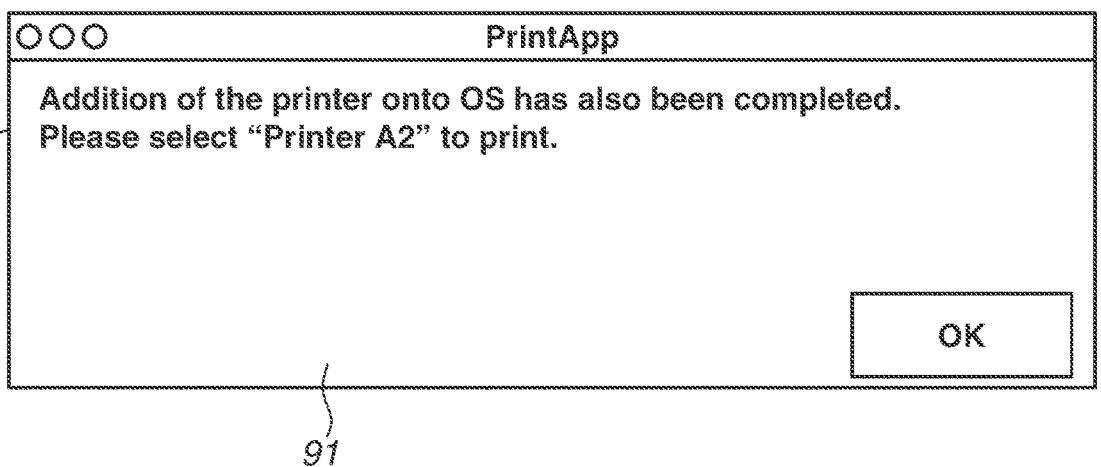
FIG. 9 illustrates a dialog informing a user of a printer to be selected on an application.

FIG. 8 is a flowchart illustrating processing of the print data conversion utility 203 according to the present exemplary embodiment. Processing in steps S501 to S601 in FIG. 8 is the same as those in FIG. 6, and description thereof is omitted. In FIG. 8, after the completion of automatic registration of a printer, the print data conversion utility 203 performs, in step S801, processing to inform the user of a printer to be selected when a print instruction is given. FIG. 9 illustrates an example of an informing dialog 91 that is a notification item to be displayed in this step. In FIG. 9, the informing dialog 91 contains two text sets. One of these text sets indicates that printer registration on the OS-standard print system 202 has been completed. The other text set notifies the user of the printer name of a printer to be selected by the user when printing is performed. As the printer name of a printer recommended in this example, the printer name of a printer automatically registered on the OS-standard print system 202 in the first embodiment is displayed.

According to the present exemplary embodiment, the above informing is performed after the printer registration onto the OS-standard print system 202, which makes it easier for the user to grasp which printer the user is to select when a print instruction is given.

Next, a third exemplary embodiment is described. In the second exemplary embodiment, the user is informed in step S801 each time after a printer is automatically registered on the OS-standard print system 202. The present exemplary embodiment is characterized in that whether to inform the user is determined depending on the printer registration condition. In the following description, description similar to that in the above-described embodiments is omitted and only the differences therefrom are described.

<Printer Notification Processing Depending on Printer Addition Condition>

Figure 10:
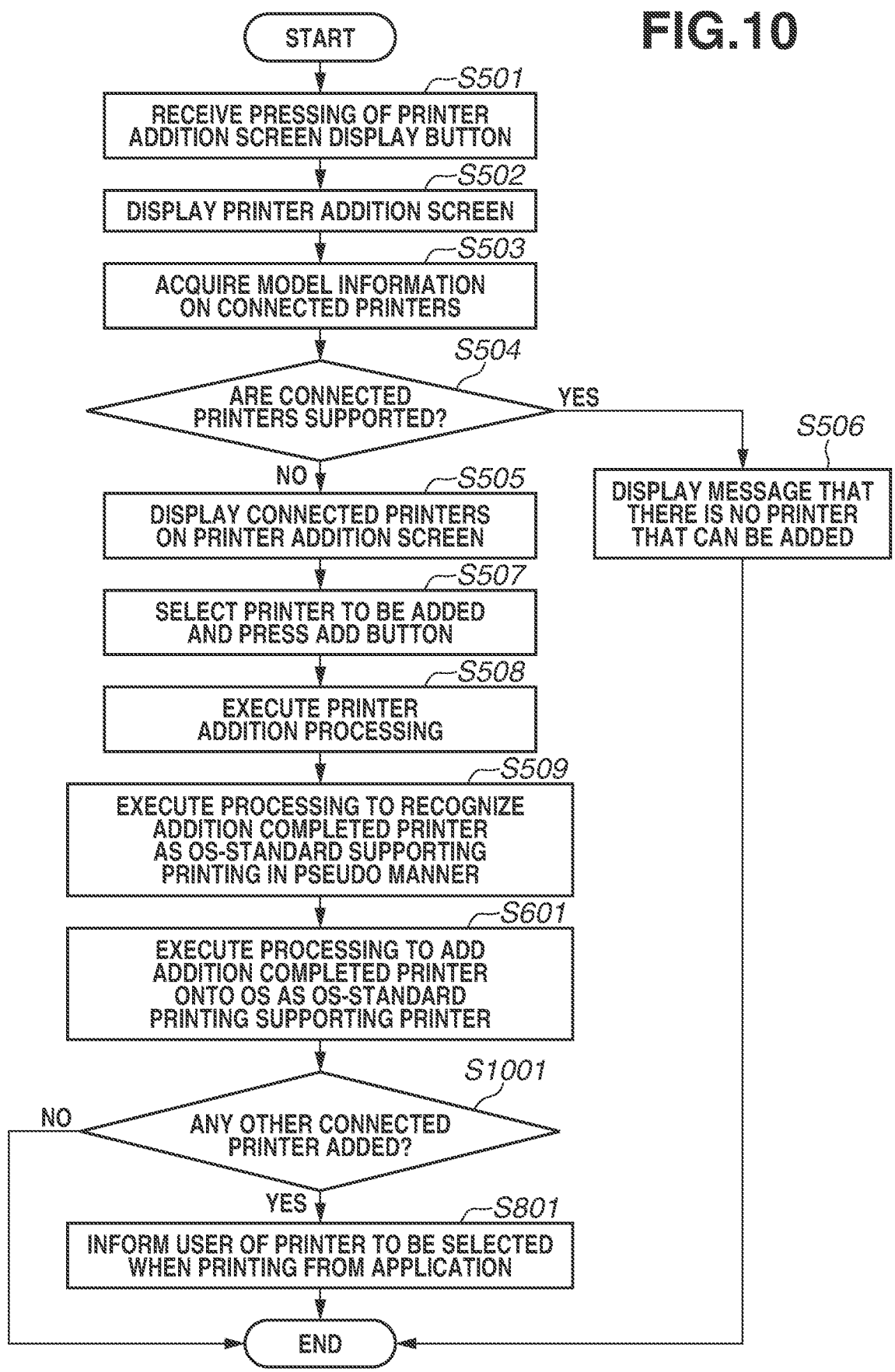
FIG. 10 is a flowchart illustrating printer addition processing in the print data conversion utility.

In the present exemplary embodiment, whether to inform the user is determined with reference to the printer addition condition. FIG. 10 illustrates a flow of processing in the print data conversion utility 203 according to the present exemplary embodiment. Processing in steps S501 to S601 in FIG. 10 is the same as those in FIG. 6 and description thereof is omitted.

In step S1001, the print data conversion utility 203 determines whether any other printer has been added on the OS-standard print system 202. When the print data conversion utility 203 determines in step S1001 that another printer has been added, it means that, other than the printer added onto the OS in step S601, a printer that supports the OS-standard print system 202 has been already added. In this case (YES in step S1001), the processing proceeds to step S801. When printing is performed, it is desirable that the user select the printer added in step S601 on a print dialog of the drawing application 201. Therefore, in step S801, the user is informed of a printer that is to be selected. The dialog to be used in step S801 for the informing is the same screen as that described in the second exemplary embodiment. On the other hand, when the print data conversion utility 203 determines in step S1001 that no other printers have been added (NO in step S1001), it means that the printer added in step S601 is the only the printer that has been added onto the OS at the current time. Therefore, the user is not confused about which printer to select. Since the informing is not needed in this case (No in step S1001), step S801 is skipped and the processing ends. In this manner, control that skips the informing when the informing is bothersome to the user, such as when no other printers have been added, can be executed.

Next, a fourth exemplary embodiment is described. In the present exemplary embodiment, a printer is not automatically added onto the OS-standard print system 202 unlike in each of the first to third exemplary embodiments. Instead, an example is described in which the user is prompted to select, on a screen provided by the OS-standard print system 202, a printer to be registered on the OS-standard print system 202. In the following description, description of the same points as those of the above-described embodiments is omitted and only the differences are described.

<Processing to Change Printer Name>

In the present exemplary embodiment, on the printer addition screen 41 provided by the OS-standard print system 202, a printer name displayed in the printer list 42 is changed so that a printer is easily understood to be a printer for the print data conversion utility 203.

Figure 11:
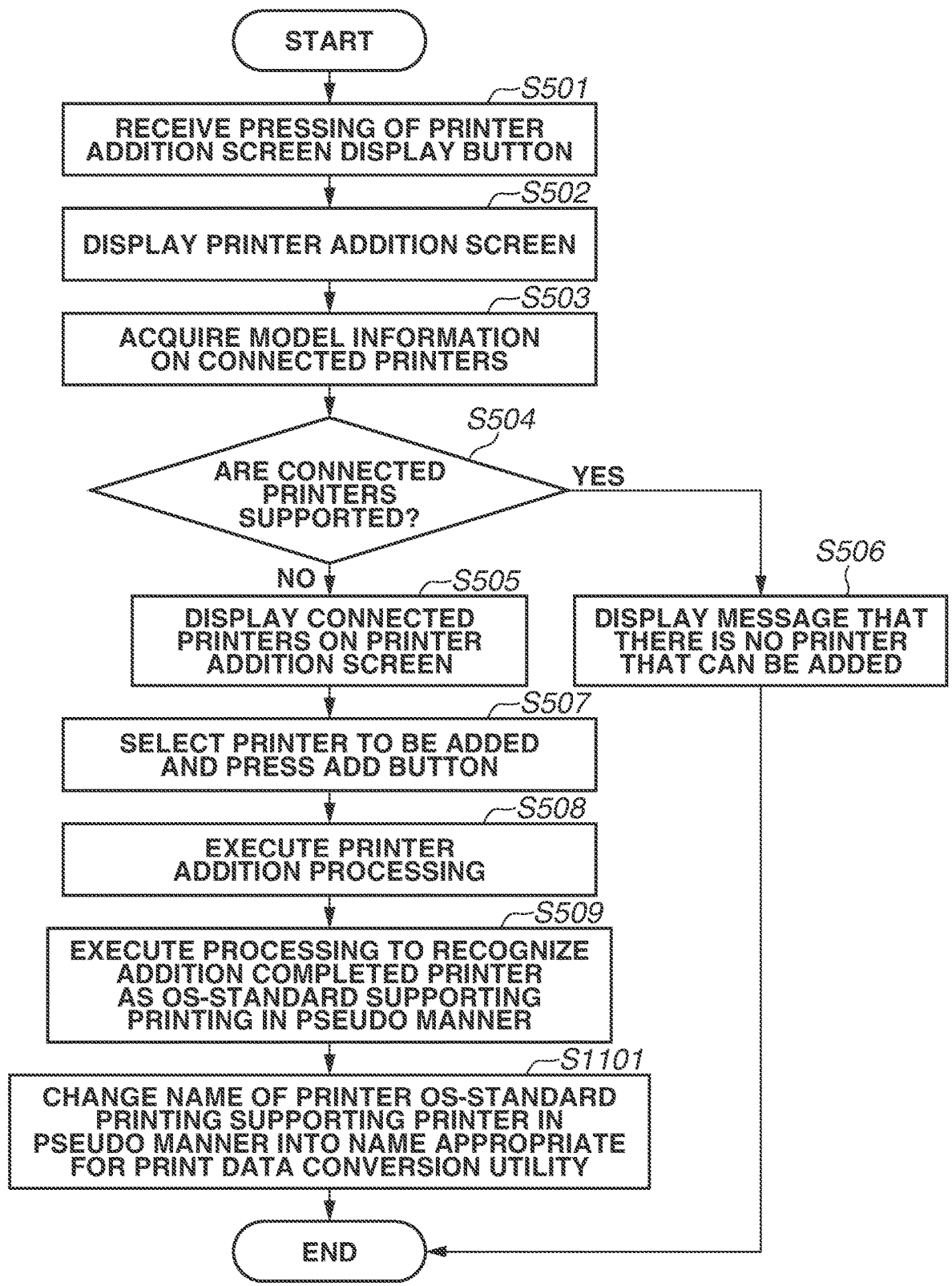
FIG. 11 is a flowchart illustrating printer addition processing in the print data conversion utility.

FIG. 11 is a flowchart illustrating processing to add a printer onto the print data conversion utility 203 according to the present exemplary embodiment. Processing in steps S501 to S508 in FIG. 11 is the same as those in FIG. 6 and description thereof is omitted. In step S509 in the present exemplary embodiment, the print data conversion utility 203 notifies the OS-standard print system 202 that the printer has been added onto the print data conversion utility 203.

Subsequently, in step S1101, the print data conversion utility 203 performs processing to change the name of a printer registered on the print data conversion utility 203. The print data conversion utility 203 then transmits the changed printer name to the OS-standard print system 202. It is preferable that not only the printer name but also, as information on the registered printer, the form of connection and the capability information are transmitted at this time.

As a result, a printer list 122 displayed on the printer addition screen 41 by the OS appears as illustrated in FIG. 12. In the printer list 122 in FIG. 12, the printer name displayed as "Printer A2" in FIG. 4 is displayed as "Printer A For PrinterApp". This enables the user to more easily understand that the printer has been registered on the print data conversion utility 203. Therefore, even when the user is to select a printer on the printer addition screen 41 provided by the OS-standard print system 202, the user can more easily select a printer registered on the print data conversion utility 203, which is preferable.

In FIG. 11, step S1101 is executed after step S509. However, it is not limited thereto. Specifically, step S509 may be skipped. In step S1101, the processing to transmit the changed printer name to the OS-standard print system 202 may be replaced by specific processing for treating the printer 12 as supporting the OS-standard print system 202.

Next, a fifth exemplary embodiment is described. In the present exemplary embodiment, an example is described in which, on the printer addition screen 41 provided by the OS-standard print system 202 in the fourth exemplary embodiment, the user is notified of which printer name the user is to select. In the following description, the drawings and description thereof that are the same as those of the above-described embodiments are omitted and only the differences are described.

<Guidance Processing on Printer to be Selected>

Figure 13:
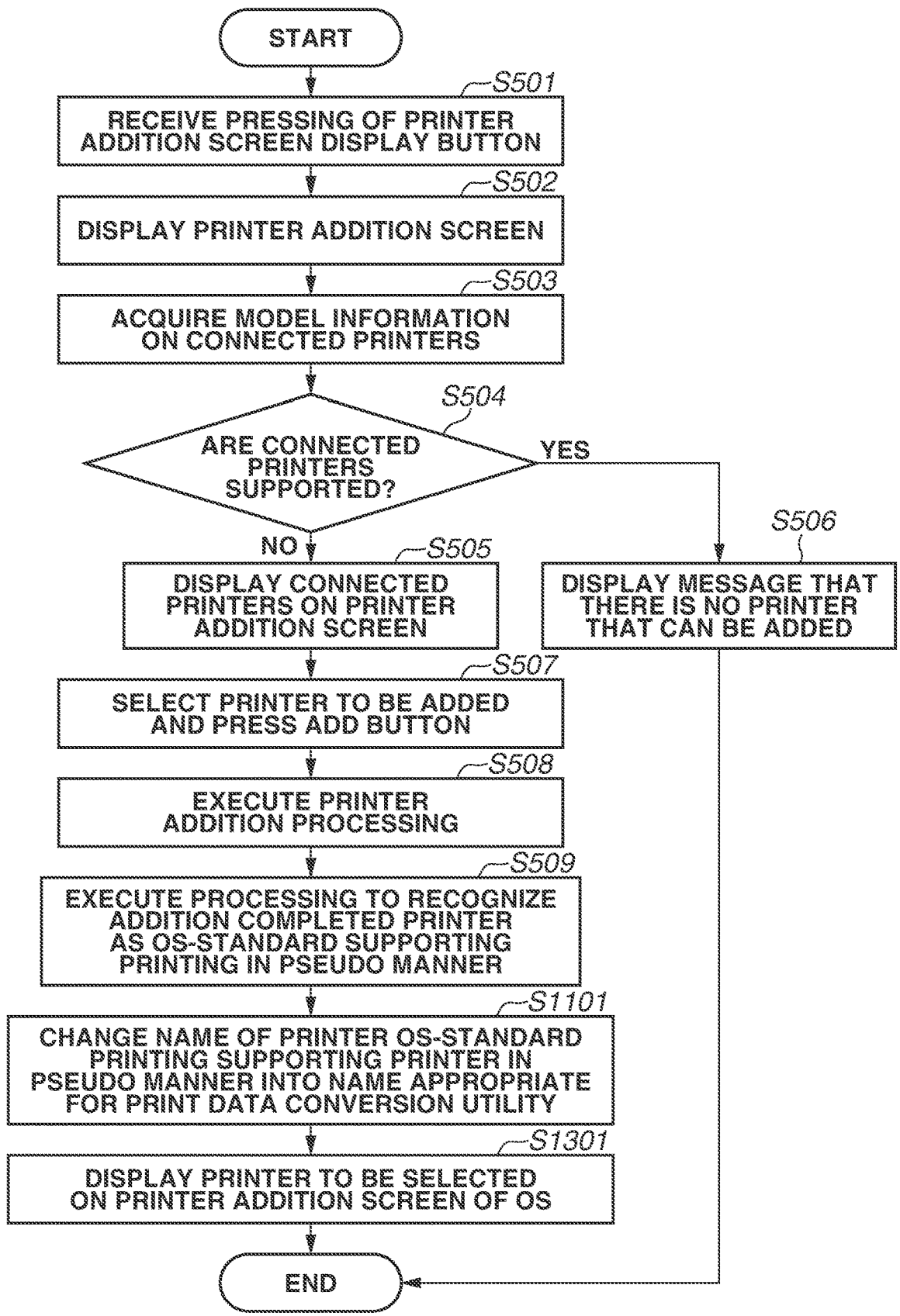
FIG. 13 is a flowchart illustrating printer addition processing in the print data conversion utility.

In the present exemplary embodiment, the print data conversion utility 203 guides the user about which printer to select on the printer addition screen 41 provided by the OS-standard print system 202. FIG. 13 is a flowchart illustrating processing to add a printer onto the print data conversion utility 203 according to the present exemplary embodiment. Processing in steps S501 to S1101 is the same as that in FIG. 11 and description thereof is omitted. In the present exemplary embodiment, a dialog that guides the user about which printer to select on the printer addition screen 41 of the OS-standard print system 202 is displayed as a notification item in step S1301. An example of such a guidance dialog is illustrated in FIG. 14.

Figure 14:
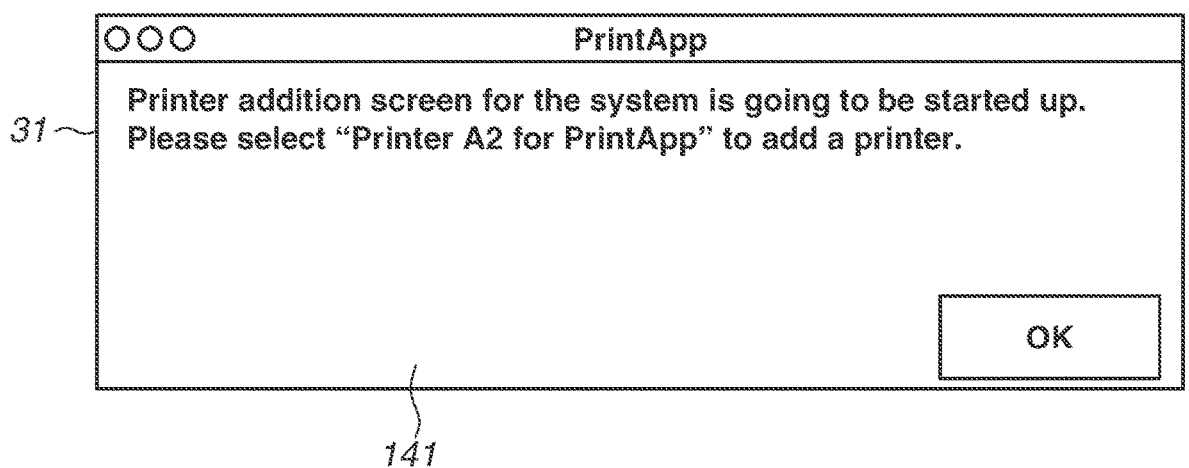
FIG. 14 is a schematic view illustrating a dialog informing a printer to be selected on the addition screen of the OS.

In a guidance dialog 141 in FIG. 14, the printer name "Printer A For Printer App" that has been already changed in step S1101 is displayed, whereby the user is guided so that this printer name may be selected on the printer addition screen 41.

The present exemplary embodiment enables the user to more easily select, on the printer addition screen 41 provided by the OS-standard print system 202, a printer registered on the print data conversion utility 203, which is preferable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to appropriately give an instruction for printing using the OS-standard print function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method implemented by at least one processor in an information processing apparatus in which first print control software and second print control software different from the first print control software are installed, the control method comprising:
   causing a display device to display a first selection screen provided by the first print control software and including a first display item regarding a first printing apparatus that communicates with the information processing apparatus;
   accepting, on the first selection screen, an instruction for registering the first printing apparatus, and wherein a print queue for the first print control software and a print queue for the second print control software are generated, based on the accepting of the instruction, and wherein, by the print queue for the first print control software and the print queue for the second print control software being generated, the first print control software is able to receive print data in a first format that is generated by the second print control software; and
   converting the received print data into print data in a second format different from the first format.

2. The control method according to claim 1,
   wherein, based on the accepting of the instruction for registering the first printing apparatus, an instruction for generating the print queue for the second print control software is transmitted to the second print control software, and
   wherein the print queue for the second print control software is generated, based on the instruction transmitted from the first print control software.

3. The control method according to claim 1, wherein, based on the accepting of the instruction for registering the first printing apparatus, the print queue for the second print control software is generated without a user instruction on a second selection screen provided by the second print control software.

4. The control method according to claim 1, wherein the first printing apparatus is a printing apparatus incapable of interpreting the print data in the first format generated by the second print control software and capable of interpreting the print data in the second format, and
   wherein, by the print data in the second format being transmitted to the first printing apparatus, the first printing apparatus is able to execute printing.

5. The control method according to claim 1, wherein, in a case of causing a second printing apparatus capable of interpreting the print data in the first format to execute printing, the print data in the first format generated by the second print control software is transmitted to the second printing apparatus.

6. The control method according to claim 1, wherein, in a case where the information processing apparatus and the first printing apparatus are capable of communicating with each other, a second display item regarding the first printing apparatus is displayed on a second selection screen provided by the second print control software, even in a state where the print queue for the second print control software is not generated.

7. The control method according to claim 1, wherein information related to the first printing apparatus is registered in the second print control software, in a case where the information related to the first printing apparatus is transmitted to the second print control software based on the accepting of the instruction for registering the first printing apparatus.

8. The control method according to claim 7, further comprising causing the display device to display a notification item that prompts a user to select information related to the first printing apparatus registered on the second print control software in a case where a user gives a print instruction.

9. The control method according to claim 8, further comprising:
   determining whether a print queue of a second printing apparatus capable of interpreting the print data in the first format is registered for the second print control software;
   causing the display device to display a notification item in a case where it is determined that the print queue of the second printing apparatus is registered for the second print control software; and
   not causing the display device to display the notification item in a case where it is determined that the print queue of the second printing apparatus is not registered for the second print control software.

10. The control method according to claim 1, further comprising:
    changing information related to the first printing apparatus, based on the accepting of the instruction for registering the first printing apparatus; and
    transmitting the information related to the first printing apparatus after changing the information related to the first printing apparatus, to the second print control software.

11. The control method according to claim 10,
    wherein a second display item regarding the first printing apparatus is displayed on a second selection screen provided by the second print control software, based on the changed information related to the first printing apparatus, and
    wherein the first printing apparatus is registered in the second print control software, in a case where a user selects the second display item on the second selection screen.

12. A non-transitory computer-readable storage medium storing executable instructions, which when executed by one or more processors, cause an information processing apparatus, in which first print control software and second print control software different from the first print control software are installed, to perform operations comprising:
    causing a display device to display a first selection screen provided by the first print control software and including a first display item regarding a first printing apparatus that communicates with the information processing apparatus;
    accepting, on the first selection screen, an instruction for registering the first printing apparatus, and wherein a print queue for the first print control software and a print queue for the second print control software are generated, based on the accepting of the instruction, and wherein, by the print queue for the first print control software and the print queue for the second print control software being generated, the first print control software is able to receive print data in a first format that is generated by the second print control software; and converting convert the received print data into print data in a second format different from the first format.

13. The non-transitory computer-readable storage medium according to claim 12,
wherein, based on the accepting of the instruction for registering the first printing apparatus, an instruction for generating the print queue for the second print control software is transmitted to the second print control software, and
wherein the print queue for the second print control software is generated, based on the instruction transmitted from the first print control software.

14. The non-transitory computer-readable storage medium according to claim 12, wherein, based on the accepting of the instruction for registering the first printing apparatus, the print queue for the second print control software is generated without a user instruction on a second selection screen provided by the second print control software.

15. The non-transitory computer-readable storage medium according to claim 12, wherein the first printing apparatus is a printing apparatus incapable of interpreting the print data in the first format generated by the second print control software and capable of interpreting the print data in the second format, and
wherein, by the print data in the second format being transmitted to the first printing apparatus, the first printing apparatus is able to execute printing.

16. The non-transitory computer-readable storage medium according to claim 12, wherein, in a case of causing a second printing apparatus capable of interpreting the print data in the first format to execute printing, the print data in the first format generated by the second print control software is transmitted to the second printing apparatus.

17. The non-transitory computer-readable storage medium according to claim 12, wherein, in a case where the information processing apparatus and the first printing apparatus are capable of communicating with each other, a second display item regarding the first printing apparatus is displayed on a second selection screen provided by the second print control software, even in a state where the print queue for the second print control software is not generated.

18. The non-transitory computer-readable storage medium according to claim 12, wherein information related to the first printing apparatus is registered in the second print control software, in a case where the information related to the first printing apparatus is transmitted to the second print control software based on the accepting of the instruction for registering the first printing apparatus.

19. The non-transitory computer-readable storage medium according to claim 18, the operations further comprising causing the display device to display a notification item that prompts a user to select information related to the first printing apparatus registered on the second print control software in a case where a user gives a print instruction.

20. The non-transitory computer-readable storage medium according to claim 19, the operations further comprising:
determining whether a print queue of a second printing apparatus capable of interpreting the print data in the first format is registered for the second print control software;
causing the display device to display a notification item in a case where it is determined that the print queue of the second printing apparatus is registered for the second print control software; and
not causing the display device to display the notification item in a case where it is determined that the print queue of the second printing apparatus is not registered for the second print control software.

21. The non-transitory computer-readable storage medium according to claim 12, the operations further comprising:
changing information related to the first printing apparatus, based on the accepting of the instruction for registering the first printing apparatus; and
transmitting the information related to the first printing apparatus after changing the information related to the first printing apparatus, to the second print control software.

22. The non-transitory computer-readable storage medium according to claim 21,
wherein a second display item regarding the first printing apparatus is displayed on a second selection screen provided by the second print control software, based on the changed information related to the first printing apparatus, and
wherein the first printing apparatus is registered in the second print control software, in a case where a user selects the second display item on the second selection screen.

* * * * *